Dec. 20, 1938. A. W. BORTZ 2,140,951
BATTERY FILLER
Filed Feb. 15, 1938 2 Sheets-Sheet 1
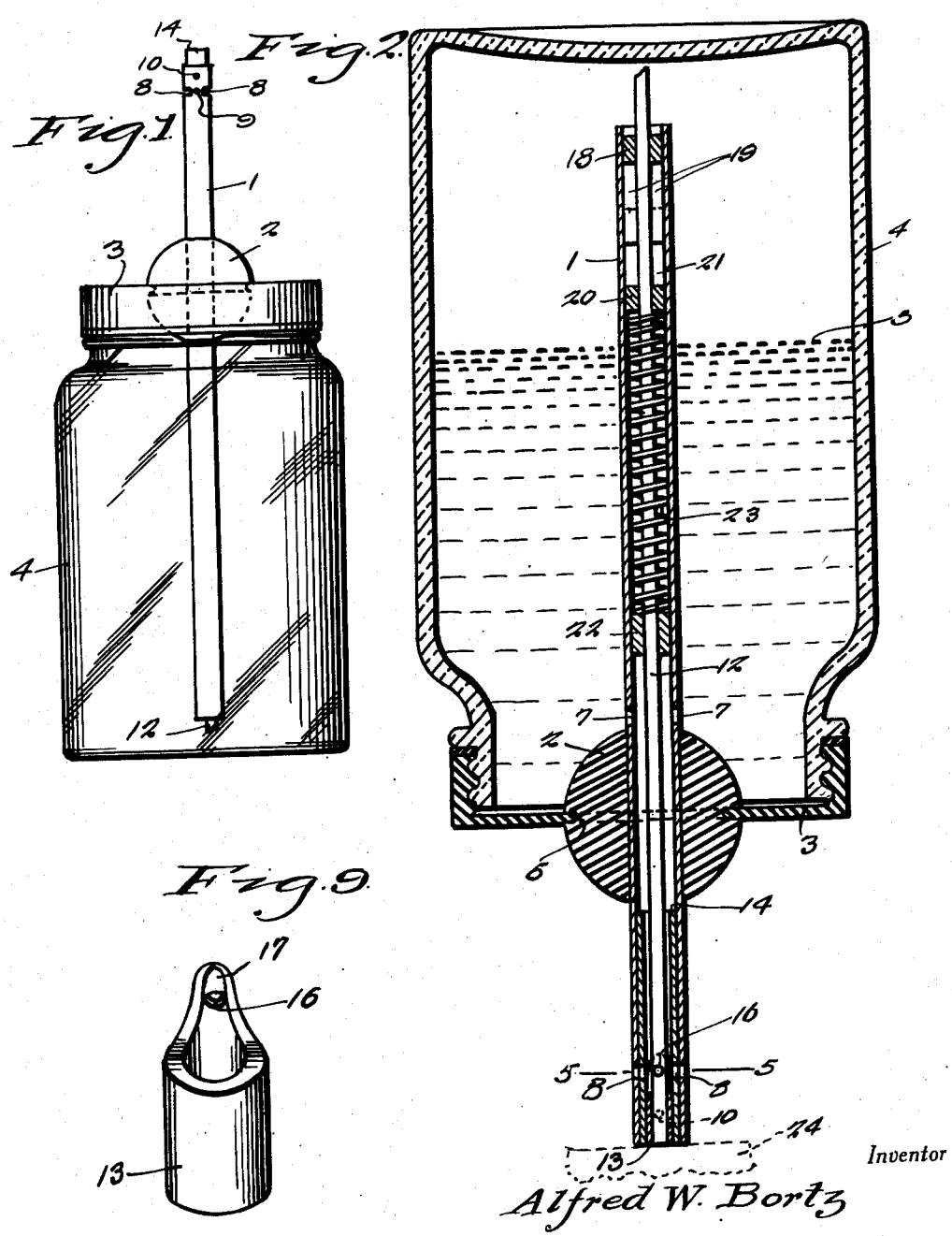
Inventor
Alfred W. Bortz
By Clarence A. O'Brien
Hyman Berman
Attorneys Dec. 20, 1938. A. W. BORTZ 2,140,951
BATTERY FILLER
Filed Feb. 15, 1938 2 Sheets-Sheet 2
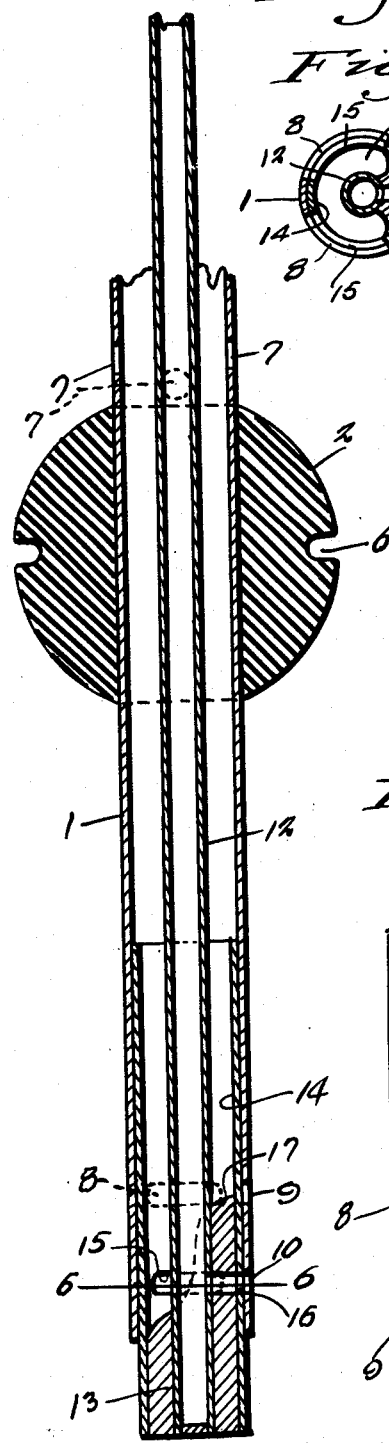
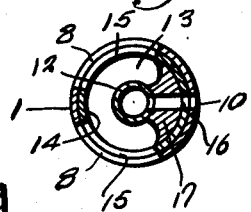
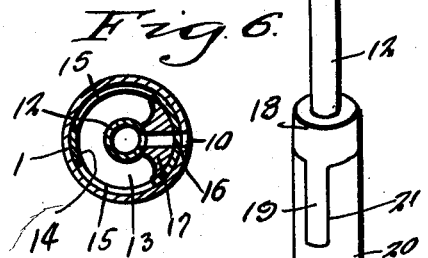
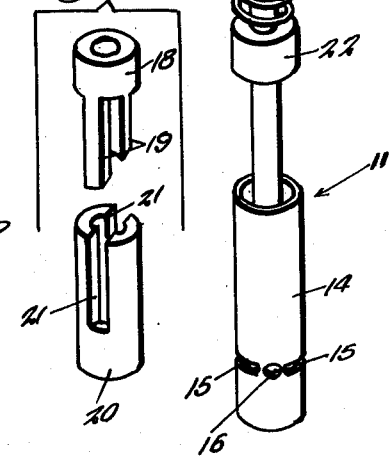
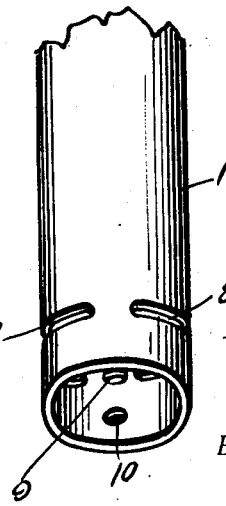
Inventor
Alfred W. Bortz
By Clarence A. O'Brien
Hyman Berman
Attorneys Patented Dec. 20, 1938

2,140,951

UNITED STATES PATENT OFFICE 2,140,951

BATTERY FILLER

Alfred W. Bortz, Echo, Minn.

Application February 15, 1938, Serial No. 190,669

4 Claims. (Cl. 226—39)

The present invention relates to new and useful improvements in battery fillers and has for its primary object to provide, in a manner as hereinafter set forth, a device of this character embodying a novel construction, combination and arrangement of parts through the medium of which the flow of water will be automatically shut off when the liquid in the cell reaches a predetermined level.

Another very important object of this invention is to provide a battery filler of the aforementioned character embodying novel means for mounting the device on a conventional container, such as a Mason fruit jar.

Other objects of the invention are to provide a battery filler of the character described which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is an elevational view of a battery filler constructed in accordance with the present invention.

Figure 2 is a view in vertical section through the invention, showing the device inverted for discharging water into a battery cell.

Figure 3 is a vertical sectional view through a portion of the device, showing the water control means in closed position.

Figure 4 is a perspective view of the slidable valve assembly.

Figure 5 is a view in horizontal section, taken substantially on the line 5—5 of Fig. 2.

Figure 6 is a horizontal sectional view, taken substantially on the line 6—6 of Fig. 3.

Figure 7 is a perspective view of the lower end portion of the barrel.

Figure 8 is a perspective view of the guide elements, showing same separated.

Figure 9 is a detail view in perspective of the filler or bushing through the medium of which the slidable valve is mounted on the tubular stem.

Referring now to the drawings in detail, it will be seen that the embodiment of the invention which has been illustrated comprises an elongated tubular barrel 1 having fixed thereon, at an intermediate point, a resilient sphere 2 of suitable acid resisting material. Mounted on the sphere 2 is a screw cap 3, also of suitable acid resisting material, which is adapted to be mounted on a container 4, such as a Mason fruit jar. The container 4, of course, is for the reception of the battery water as at 5. The resilient sphere 2 has formed therein a circumferential groove or channel 6 for the reception of the screw cap 3, said screw cap having a centrally located opening therein accommodating said sphere.

Above the sphere 2, when the device is in inverted position, the valve 1 has formed therein a plurality of water intake ports 7. In its outer or lower end portion, the barrel 1 is further provided with water discharge ports 8 in the form of circumferentially extending slots. This end portion of the barrel 1 is also provided with vents 9 and 10, the former being in the horizontal plane of the ports 8.

Mounted for reciprocation in the barrel 1 is a valve assembly which is designated generally by the reference numeral 11. The assembly 11 includes a tubular stem 12 which is mounted centrally in the barrel 1 in spaced, concentric relation thereto, said stem being of greater length than said barrel. Secured on the lower end portion of the stem 12 in spaced concentric relation thereto through the medium of a filler or bushing 13 is a cylinder 14 which is slidable in the lower end portion of the barrel 1. It may be well to here state that the tubular stem 12 is open at its upper end for communication at all times with the container 4 while said tubular stem is closed at its lower end, as shown in Figure 3 of the drawings. The cylinder 14 has formed therein ports 15 in the form of circumferentially extending slots for registry with the ports 8 in the barrel 1. The cylinder 14 is further provided, between the ports 15, with a vent 16 for communication with the vents 9 and 10 in the barrel 1. Rising from the bushing 13 is an extension 17. The vent 16 extends through the extension 17 and the tubular stem 12, as illustrated to advantage in Fig. 3 of the drawings. This construction and arrangement facilitates the drilling of the vent 16 in the elements 14 and 12 in one operation.

Fixed in an upper portion of the barrel 1 is a guide 20 having vertical slots 21 therein. The stem 12 passes slidably through the guide 20. The reference numeral 18 designates a sleeve which is fixed on an upper portion of the tubular stem 12, said sleeve 18 including depending legs 19 which are slidably engaged in the slots 21 of the guide 20. Also fixed on the tubular stem 12, in spaced relation below the guide 20, is a collar 22. A rubber covered coil spring 23 is mounted on the tubular stem 12 and has one end engaged with the guide 20 and its other end engaged with the collar 22 for yieldingly urging the cylinder 14 to the position shown in Fig. 3 of the drawings.

It is thought that the operation of the invention will be readily apparent from a consideration of the foregoing. When the device is inverted for filling a battery cell, water from the container 4 enters the lower portion of the barrel 1 through the ports 7 but said water cannot escape into the cell for the reason that the ports 8 and 15 are out of registry, as seen in Fig. 3 of the drawings. When in this position air is free to enter the upper portion of the inverted container 4 through the registering ports 10, 16 and the tubular stem 12. With the lower end of the projecting cylinder 14 resting on the plates and separators of the battery cell, as at 24 in Fig. 2 of the drawings, downward pressure is exerted on the container 4 for sliding the barrel 1 downwardly on the cylinder 14 against the tension of the coil spring 23 thereby bringing the ports 8 and 15 as well as the vents 9 and 16 into registry. The water is then free to flow into the battery cell from the barrel 1 and air now enters the upper portion of the inverted container 4 through the vents 16 and 9 and the tubular stem 12. However, when the level of the liquid in the battery cell rises above the port 9 the water 5 in the container 4 becomes air bound and said water ceases to flow to the battery cell as a result. When the device is withdrawn from the cell the cylinder 14 is immediately projected to the position shown in Fig. 3 of the drawings by the spring 23 for again closing the ports 8. It has been hereinbefore stated that downward pressure is exerted on the container 4 to overcome the tension of the spring 23. Such pressure may not be necessary as the spring 23 may be of a strength to be overcome by the weight of the container 4 and the water 5 therein when the device is inverted and resting on the plates and separators of the battery cell. The coacting elements 18 and 20 prevent rotation of the assembly 11 in the barrel 1. The resiliency of the sphere 2 permits universal swinging movement of the barrel 1 in the screw cap 3.

It is believed that the many advantages of a battery filler constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:—

1. A battery filler comprising a barrel having longitudinally spaced inlet and outlet ports therein, means for controlling the outlet ports, a substantially spherical resilient member mounted on the barrel between the inlet and outlet ports, and a closure mounted on said resilient member and engageable with a water container.

2. A battery filler comprising a barrel having longitudinally spaced inlet and outlet ports therein, means for controlling the outlet ports, a substantially spherical resilient member mounted on the barrel between the inlet and outlet ports, and a closure mounted on said resilient member and engageable with a water container, said resilient member having a circumferential groove therein for the reception of the closure, said closure having an opening therein accommodating the resilient member.

3. A battery filler comprising an elongated barrel having longitudinally spaced inlet and outlet ports therein, means on the barrel between the inlet and outlet ports for mounting said barrel on a water container, said barrel further having longitudinally spaced vents therein, a tubular stem mounted for sliding movement in the barrel, a cylinder slidably mounted in the barrel and fixed on the tubular stem, said cylinder having ports therein for communication with the outlet ports of the barrel, said cylinder and the tubular stem having a vent therein for registry with the first named vents, and resilient means mounted in the barrel and operatively connected with the tubular stem for actuating the cylinder for moving the second named ports out of communication with the outlet ports.

4. A battery filler comprising an elongated barrel having longitudinally spaced inlet and outlet ports therein and further having longitudinally spaced vents therein, resilient means on the barrel between the inlet and outlet ports for mounting said barrel on a water container for universal swinging movement, a cylinder slidably mounted in the barrel and having ports therein for registry with the outlet ports, said cylinder further having a vent therein for communication with the first named vents, a tubular stem fixed to the cylinder and extending longitudinally through the barrel in spaced, concentric relation thereto, said tubular stem being open at one end for communication with the container, said tubular stem further having communication with the second named vent, coacting guide elements in the barrel and on the tubular stem for slidably securing said tubular stem against rotation in said barrel, a collar fixed on the tubular stem, and a coil spring mounted in the barrel and encircling the tubular stem and having one end engaged with one of the guide elements and its other end engaged with said collar for yieldingly urging the cylinder to a position in the barrel where the ports in said cylinder are out of communication with the outlet ports in said barrel.

ALFRED W. BORTZ.